(12) United States Patent
Tsui et al.

(10) Patent No.: US 8,135,114 B2
(45) Date of Patent: Mar. 13, 2012

(54) METHOD AND APPARATUS FOR CREATING AN ANSWER TONE FOR A COMPUTING DEVICE WITH PHONE CAPABILITIES OR A TELEPHONE

(75) Inventors: Daren Tsui, San Carlos, CA (US); Edwin Ho, Palo Alto, CA (US); Derek Lyon, Palo Alto, CA (US)

(73) Assignee: Mspot, Inc., Palo Alto, CA (US)

( * ) Notice: Subject to any disclaimer, the term of this patent is extended or adjusted under 35 U.S.C. 154(b) by 736 days.

(21) Appl. No.: 12/167,162

(22) Filed: Jul. 2, 2008

(65) Prior Publication Data

US 2009/0041208 A1 Feb. 12, 2009

Related U.S. Application Data

(60) Provisional application No. 60/954,268, filed on Aug. 6, 2007.

(51) Int. Cl.
*H04M 1/64* (2006.01)
*H04M 3/42* (2006.01)
*G06F 15/16* (2006.01)

(52) U.S. Cl. .............. 379/87; 84/616; 369/84; 370/337; 370/352; 379/70; 379/93.05; 379/207.13; 379/252; 379/373.01

(58) Field of Classification Search .................. 370/337, 370/352; 375/222; 379/87, 93.05, 93.32, 379/93.34, 102.06, 70, 88.11, 207.13, 215.01, 379/221.08, 373.01, 373.02, 93.27, 252; 455/414.1, 567, 418; 709/217, 246, 203; 715/748; 84/616; 369/84
See application file for complete search history.

(56) References Cited

U.S. PATENT DOCUMENTS

| | | | | |
|---|---|---|---|---|
| 4,686,699 A * | 8/1987 | Wilkie | ........ | 379/93.05 |
| 5,349,635 A * | 9/1994 | Scott | ........ | 379/93.34 |
| 5,475,741 A * | 12/1995 | Davis et al. | ........ | 379/102.06 |
| 5,684,825 A * | 11/1997 | Ko | ........ | 375/222 |
| 5,926,537 A * | 7/1999 | Birze | ........ | 379/252 |
| 6,061,340 A * | 5/2000 | Albrow et al. | ........ | 370/337 |
| 6,094,587 A * | 7/2000 | Armanto et al. | ........ | 455/567 |
| 6,308,086 B1 * | 10/2001 | Yoshino | ........ | 455/567 |
| 6,714,637 B1 * | 3/2004 | Kredo | ........ | 379/215.01 |
| 6,778,648 B1 * | 8/2004 | Alston et al. | ........ | 379/93.27 |
| 7,020,497 B2 * | 3/2006 | Deeds | ........ | 455/567 |
| 7,136,679 B2 * | 11/2006 | Beauford | ........ | 455/567 |
| 7,233,658 B2 * | 6/2007 | Koser et al. | ........ | 379/373.01 |
| 7,340,049 B2 * | 3/2008 | Batni et al. | ........ | 379/221.08 |
| 7,349,383 B2 * | 3/2008 | Chu | ........ | 370/352 |
| 7,440,444 B2 * | 10/2008 | Nishida et al. | ........ | 370/352 |
| 7,486,971 B2 * | 2/2009 | Awada et al. | ........ | 455/567 |
| 7,519,168 B2 * | 4/2009 | Suffern et al. | ........ | 379/93.32 |
| 7,613,287 B1 * | 11/2009 | Stifelman et al. | ........ | 379/215.01 |
| 2006/0028951 A1 * | 2/2006 | Tozun et al. | ........ | 369/84 |
| 2006/0112811 A1 * | 6/2006 | Padhi et al. | ........ | 84/616 |
| 2006/0136556 A1 * | 6/2006 | Stevens et al. | ........ | 709/203 |

(Continued)

OTHER PUBLICATIONS

PCT/US08/09358 International Search Report, dated Nov. 5, 2008.

(Continued)

*Primary Examiner* — Gerald Gauthier
(74) *Attorney, Agent, or Firm* — DLA Piper LLP (US)

(57) ABSTRACT

A method and apparatus for creating an answer tone for a computing device with phone capabilities or a telephone is disclosed.

14 Claims, 11 Drawing Sheets

U.S. PATENT DOCUMENTS

| | | | |
|---|---|---|---|
| 2006/0199575 A1* | 9/2006 | Moore et al. | 455/418 |
| 2006/0259434 A1 | 11/2006 | Vilcauskas et al. | |
| 2007/0028264 A1 | 2/2007 | Lowe | |
| 2007/0112977 A1* | 5/2007 | Hornal et al. | 709/246 |
| 2007/0124452 A1 | 5/2007 | Mohammed | |
| 2007/0127706 A1* | 6/2007 | Hightower et al. | 379/373.02 |
| 2007/0264978 A1* | 11/2007 | Stoops | 455/414.1 |
| 2007/0288596 A1* | 12/2007 | Sindoni | 709/217 |
| 2008/0270913 A1* | 10/2008 | Singer et al. | 715/748 |
| 2009/0003538 A1* | 1/2009 | Sharpe et al. | 379/70 |
| 2009/0003577 A1* | 1/2009 | Chin et al. | 379/207.13 |
| 2009/0029685 A1* | 1/2009 | Willis | 455/414.1 |
| 2009/0041208 A1* | 2/2009 | Tsui et al. | 379/87 |
| 2009/0042622 A1* | 2/2009 | Tsui et al. | 455/567 |
| 2010/0322392 A1* | 12/2010 | Walker et al. | 379/88.11 |

OTHER PUBLICATIONS

PCT/US08/09358 Written Opinion, dated Nov. 5, 2008.

PCT/US08/009358 International Preliminary Report on Patentability mailed Feb. 18, 2010, eight pages.

\* cited by examiner

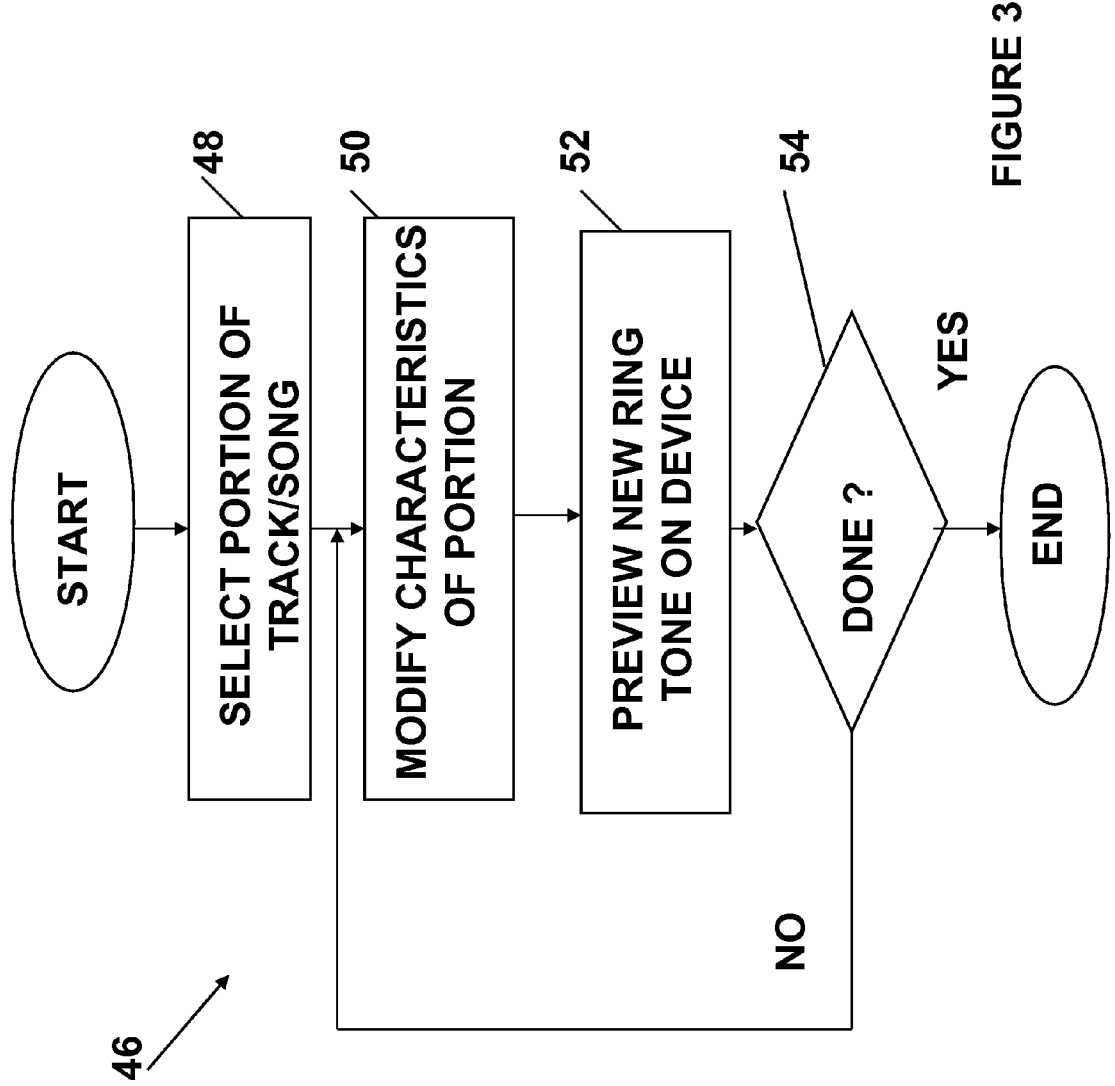

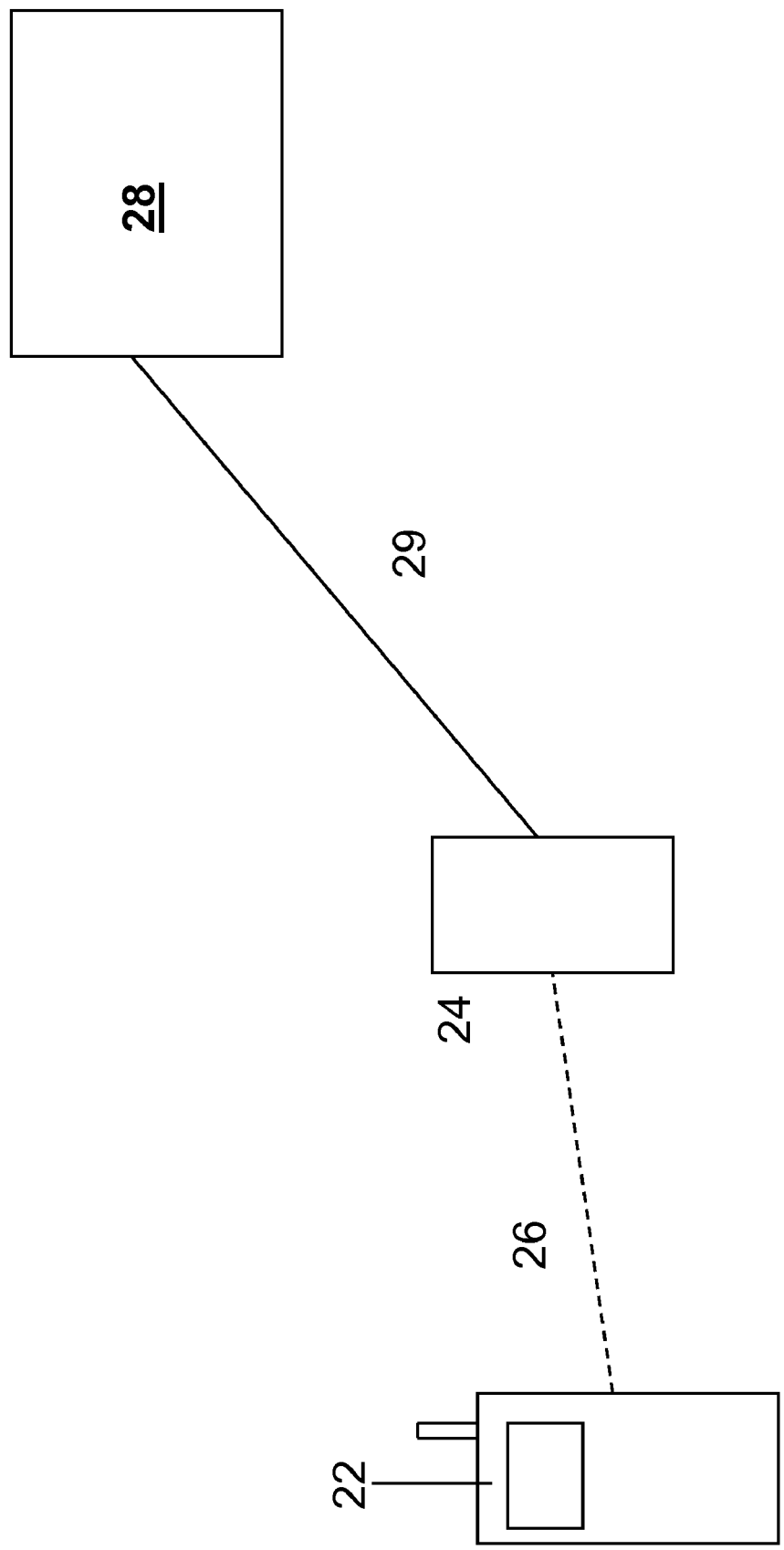

| Caller Telephone Number | Answer Tone |
|---|---|
| 555-666-0001 | 1 |
| 555-666-0002 | 47 |
| 555-666-0003 | 72 |
| 555-666-004 | 1 |
| ... | ... |

98

| Answer Tone | Digital Data |
|---|---|
| 1 | (traditional ring) |
| ... | ... |
| 47 | (portion of Beethoven's "Ode to Joy") |
| ... | ... |
| 72 | (portion of "The Star Spangled Banner") |

| Recipient Telephone Number | Answer Tone |
|---|---|
| 555-666-0001 | 1 |
| 555-666-0002 | 47 |
| 555-666-0003 | 72 |
| 555-666-004 | 1 |
| ... | ... |

102

| Answer Tone | Digital Data |
|---|---|
| 1 | (traditional ring) |
| ... | ... |
| 47 | (portion of Beethoven's "Ode to Joy") |
| ... | ... |
| 72 | (portion of "The Star Spangled Banner") |

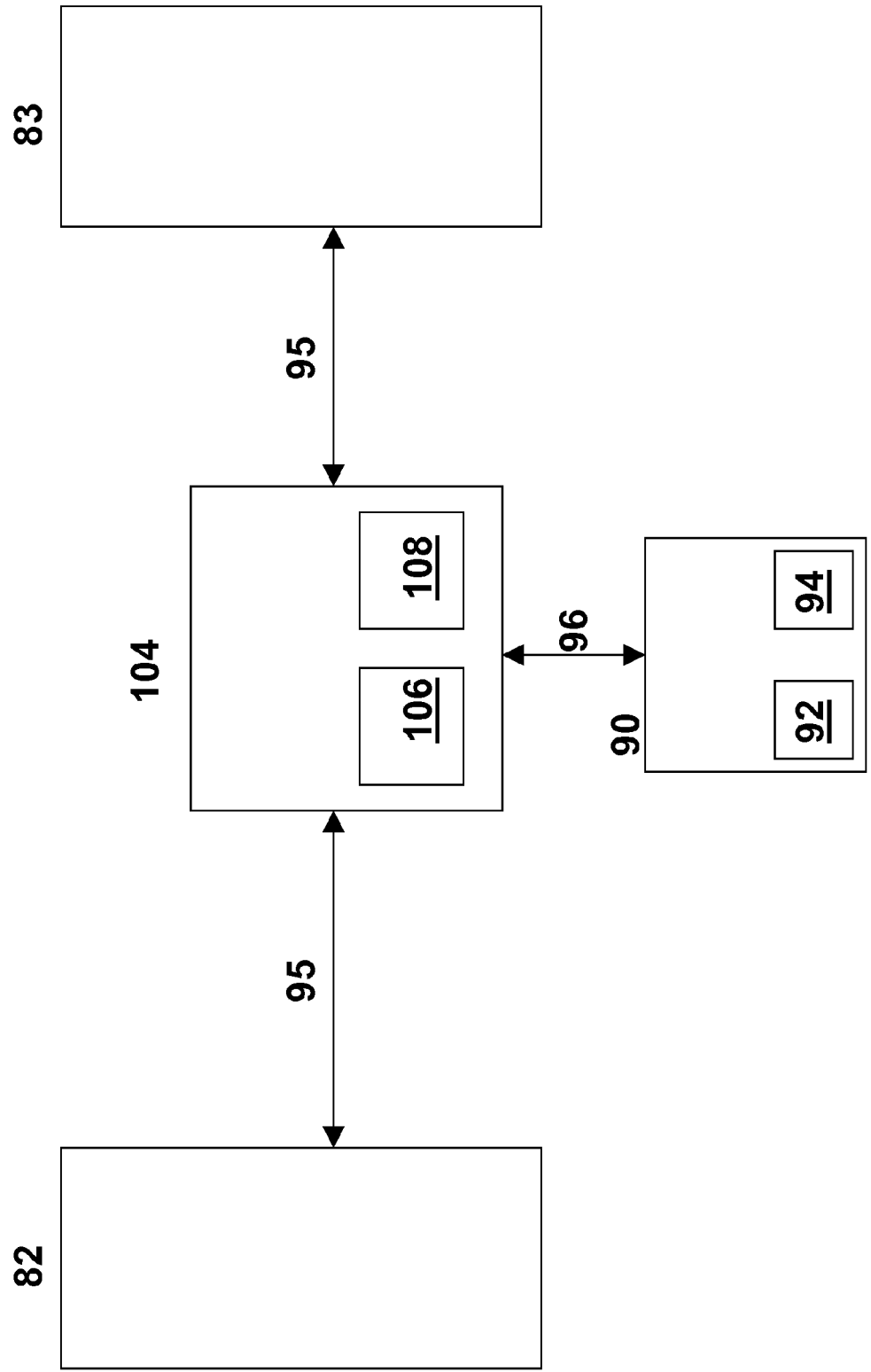

METHOD AND APPARATUS FOR CREATING AN ANSWER TONE FOR A COMPUTING DEVICE WITH PHONE CAPABILITIES OR A TELEPHONE

PRIORITY CLAIM

This application claims priority under 35 USC 119(e) and 120 to U.S. Provisional Patent Application Ser. No. 60/954,268 filed on Aug. 6, 2007, which is incorporated by reference herein.

FIELD OF THE INVENTION

The disclosure relates generally to a method and apparatus for creating an answer tone for a computing device with phone capabilities or a telephone.

BACKGROUND OF THE INVENTION

The proliferation of cellular phones and other mobile devices with phone capabilities has led to a ring tone and answer tone business where companies compete to provide ring tones and answer tones. Currently, the ring tone and answer tone market is as much as $1 billion dollars per year. There are several known techniques for getting a new answer tone.

For a user to obtain a new answer tone, the user can often browse on a computer or the mobile device to a particular website from which the user can search for and select an answertone. Once the user has selected the answer tone, the user pays for the new answer tone and enters the phone number of the user's mobile device. Once the purchase is complete, the website assigns the answer tone to the phone number entered in the previous step.

A user currently has no ability to customize their answer tone. The user must choose from a set of precut audio clips and assign it as their answer tone. The user is unable to use a website or application to customize an answer tone. Thus, it is desirable to provide an apparatus and method that permits an answer tone to be customized.

In the prior art, when a first user calls the telephone of a second user, an intermediary device (such as the central office equipment or server for traditional telephones or the wireless carrier's server for mobile devices) will generate the answer tone that is sent to the first user's telephone electrically and that the first user audibly hears through the telephone. That answer tone is chosen by the entity that controls the intermediary device, typically the local telephone company or the wireless carrier. The answer tone in the prior art typically was a ringing sound. More recently, certain wireless carriers allow users to choose an answer tone from a catalog of sounds preselected by the wireless carrier. However, the prior art systems do not allow users to use as an answer tone an audio or video clip that the user created or to modify the answer tones contained in the wireless carrier's catalog.

SUMMARY OF THE INVENTION

It is desirable to provide an apparatus and method to enable a first user to provide a customized audio clip (such as a ring tone) to the entity that controls the intermediary device such that the customized audio clip will be used when the first user calls a second user's telephone, so that the first user hears the first user's customized audio clip as the answer tone. In the alternative, it would be desirable to provide an apparatus and method to enable a second user to provide a customized audio clip (such as a ring tone) to the entity that controls the intermediary device such that the customized audio clip will be used when a first user calls a second user's telephone, so that the first user hears the second user's customized audio clip as the answer tone.

BRIEF DESCRIPTION OF THE DRAWINGS

FIGS. 2 and 3 are diagrams of a method for ringer generation;
FIG. 5 illustrates an example of a content system that may include the ringer generation system;
FIG. 9 illustrates examples of portions of tables within a rules database and a content catalog.
FIG. 10 illustrates other examples of portions of tables within a rules database and a content catalog.
FIG. 11 illustrates an example of a system for creating a "hold" clip.

DETAILED DESCRIPTION OF THE EMBODIMENTS

The system and method are particular suitable for generating an audio ringer for a mobile phone and it is in that context that the system and method are described for illustration purposes. However, the system and method may also be used to generate a ring tone for other mobile computing devices with phone capabilities and may be used to generate different ring tones, such as video ring tones or audiovisual ring tones.

Figure 1:
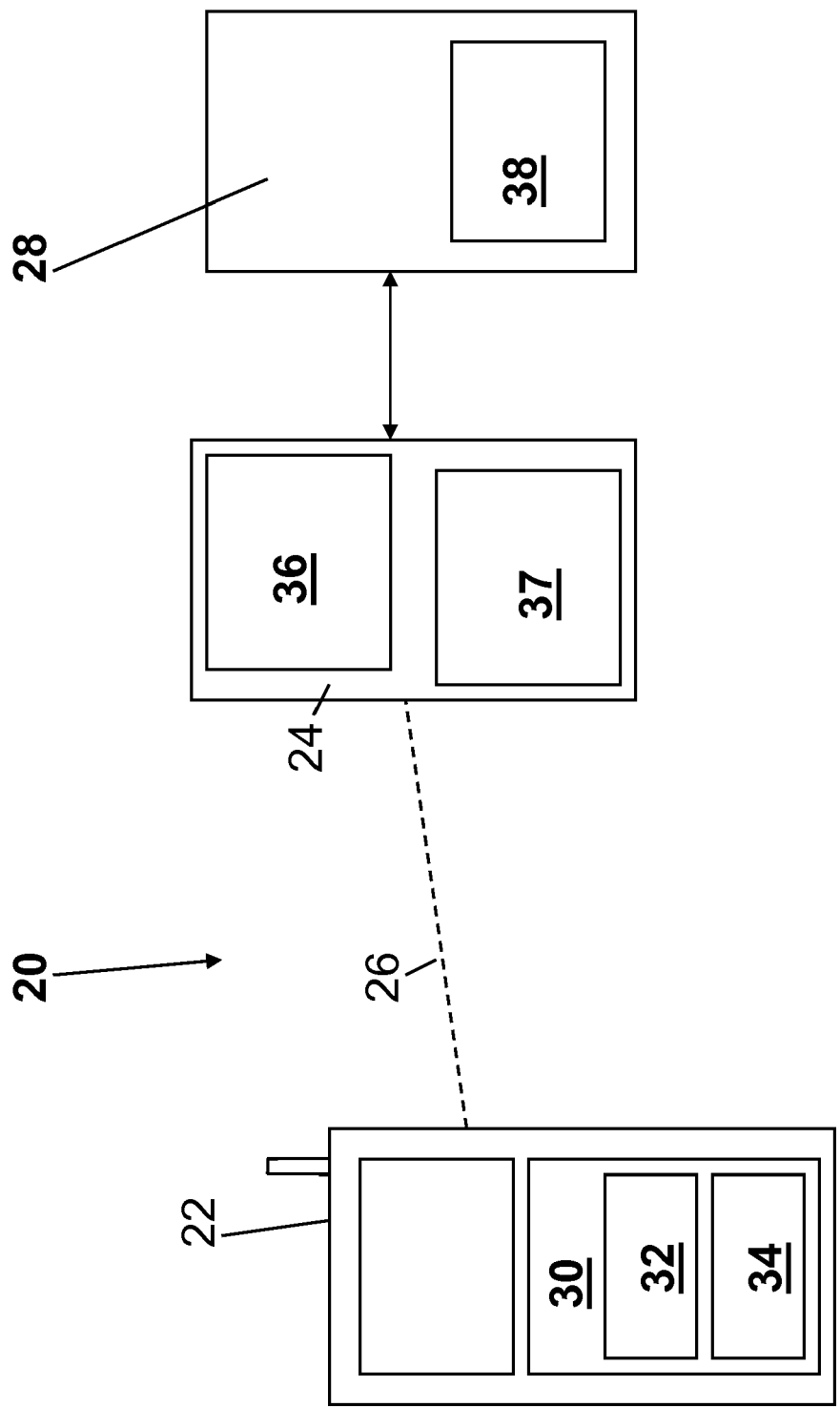
FIG. 1 is a diagram of a ringer generation system.

FIG. 1 is a diagram of a ringer generation system 22. The system may include a mobile computing device 20, such as mobile phone in the illustrated example, a generator unit 24 that can communicate and exchange data with the mobile computing device over a network 26, such as a cellular phone network in the illustrated example, and the generator unit 24 is in turn capable of communicating with and exchanging data with a computing device 28. The mobile computing device may be a processing unit based device with phone capabilities and the typical components of a device, such as a PDA, mobile phone, wireless email device (such as the Blackberry), or other handheld device that has wireless connectivity to be able to communicate with the network 26. The computing device 28 may be a processing unit based device, such as a server computer, personal computer and the like.

In the ringer generation system, the mobile computing device 20 may further include a memory 30 that may further contain a generator module 32 and a store 34 wherein the generator module 32, may be implemented for example a plurality of line of computer code that are executed by the processing unit of the mobile computing device, and may be used to generate a new ringer on the mobile computing device. In one embodiment, the generator module may be a piece of code comprising a plurality of lines of JAVA language computer code (a JAVA language application) that are executed by a Java engine that is already stored on the mobile computing device. The store 34 may be, for example, a software based database that allow the user of the mobile computing device to store one or more pieces of content that may be played by the mobile computing device such as music, video, etc. as well as the ringers that are generated by the generator module.

The generator unit 24 may be, for example, a server computer, that may further comprise a generator 36 that performs some of the functions and operations of the ringer generation method described in FIGS. 2-3 as described below in more detail. For example, the generator 36 may determine if a full track of the ringer content is available either in a content store 37 in the generator unit 24 and/or in a content store 38 associated with the computing device 28. The generator unit may also include the ability to communicate with the mobile computing device and delivering data to the mobile computing device as described in more detail below. Using the above system, the user of the mobile computing device is able to generate a new ringer directly on the mobile computing device, adjust the characteristics of the new ringer, preview the ringer before purchase and then download the new ringer.

In one illustrative embodiment, the generator module allows users to make personalized ringers for their mobile computing devices directly from their mobile computing devices. The generator module allows the user to use their own music track (in the content store in the computing device) or one from our catalog of songs (in the generator unit store) to generate the ringer. The user may be given a visual representation of the track and the user then chooses the start and end points of the ringer. The user then receives a ringer that they can use throughout their mobile computing device.

Figure 2:
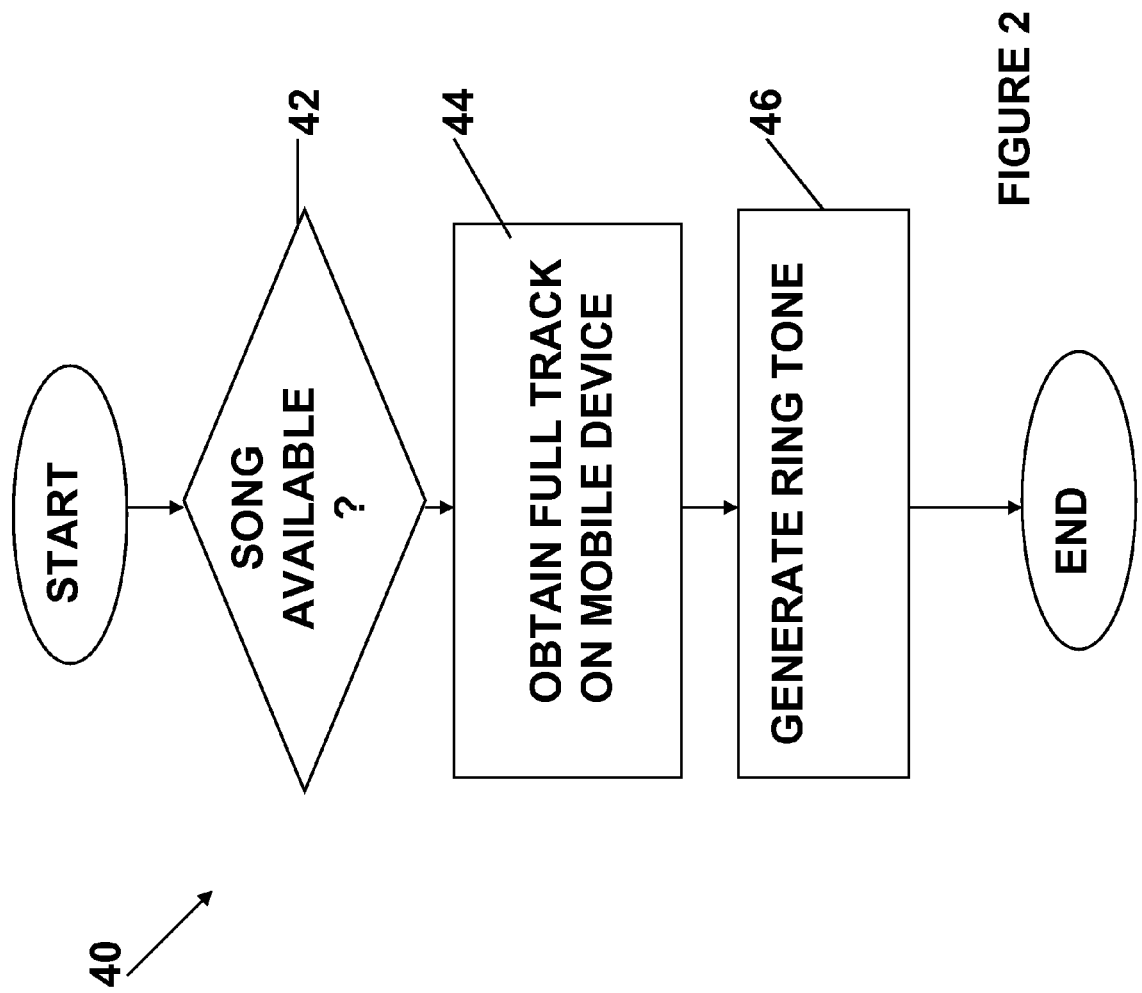

FIGS. 2 and 3 are diagrams of a method 40 for ringer generation. The method may be carried out by the generator module and the generator unit shown in FIG. 1. In the method, the user of the mobile computing device may request to make a new ringer based on a particular piece of content, such as a particular track of music. This request is communicated to the generator unit that determines if the particular track is available (42) either in the store of the generator unit and/or in the computing device store. Since the upload speed of the mobile computing device is typically slow so that it is quite time consuming to upload an entire song to the generator unit (to determine if the track is available) for processing, the mobile computing device may instead generate a digital signature for the track. The digital signature may be used by the generator unit to search the content store to determine if there is a match for the requested track in the content store in either the generator unit or the computing device. This allows the service to ensure that the end user had the digital rights (DRM) or a legitimate copy of the track/song so that the system and method can enable the ringer editing capability. This service is not possible under current rights agreements without a copy of the full track. In one example, the user may browse a user interface to select a particular track/song and then locate that song/track.

If the particular track is not available, the method is completed. On the other hand, if the track is available, then the full track is obtained by the mobile computing device (44) wherein the full track is downloaded from the generator unit since the full track on the mobile computing device (if available) will be of lower resolution and poorer quality. Once the full track is available at the mobile computing device, the generator module in the mobile computing device may be used to generate a ringer (46).

During the ringer generation, the generator module may allow the user to select a portion of the track (48) and then modify certain characteristics of the track (50). The generator module may also preview the ringer (52) on the mobile computing device. If the preview is not acceptable (54) (which is a preview of the actual ringer), the method loops back to any prior process so that the user can revise and redo the ringer. If the ringer is acceptable, then the method is completed and the ringer is purchased by the user and the user can use the ringer. In addition, a user may move between any process in FIG. 3 and any other process in FIG. 3.

The system and method may be used to generate an audio ringer (described above). It may also be used for video ringers, a ringer linked with an image or an audiovisual ringer. The track/song used to generate the ringer may be the songs/tracks already stored in the mobile computing device, a catalog of tracks/songs maintained by the generator system (so the user can purchase the full track and then create the ringer) or songs/tracks located on the computing device owned by the user.

Figure 4C:
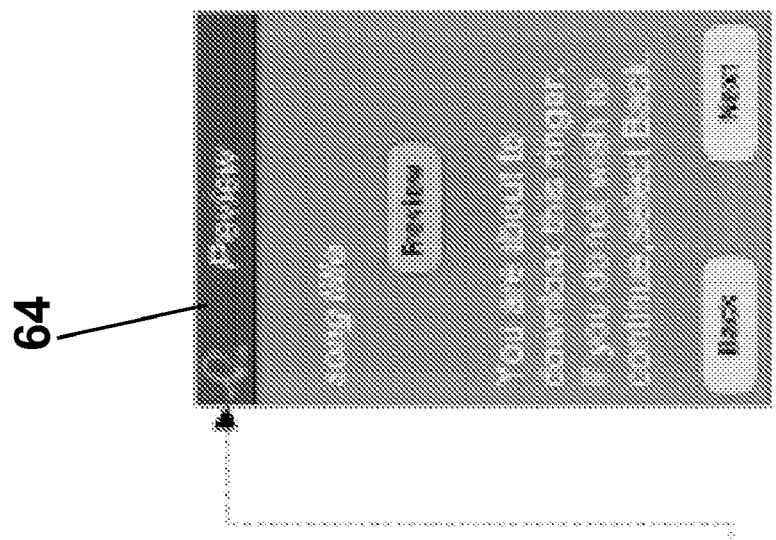
FIGS. 4A, 4B and 4C illustrate examples of a user interface for an implementation of the ringer generation system implemented on a mobile device.
Figure 4B:
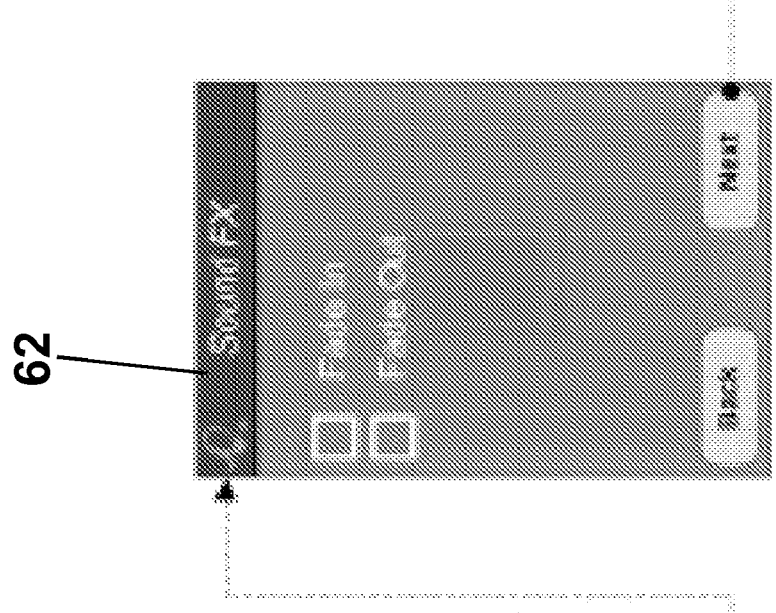
Figure 4A:
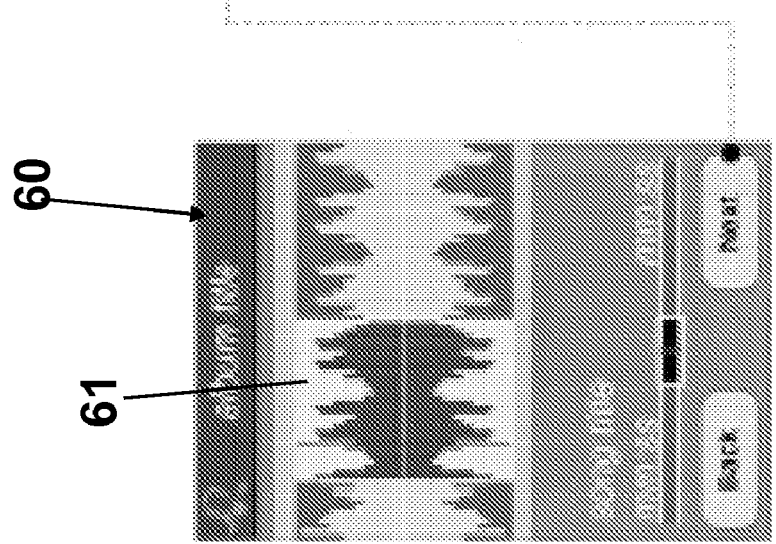

FIGS. 4A, 4B and 4C illustrate examples of a user interface for an implementation of the ringer generation system implemented on a mobile device. Most mobile computing devices have an input device, such as a four way keypad that may be used as the primary interface device for the ringer generation method that allow the user to create and/or modify a ringer. The input device permits the user to edit, zoom, playback, and download the track and/or ringer. When doing zooming/editing of the track profile, the digital data representing the track is downloaded to the mobile computing device from the generator unit (rather than having the processing unit of the mobile computing device generate the visual representation of the track) so that the zooming and/or editing can be done without using the limited CPU of the handset.

As shown in FIG. 4A, a user interface 60 allows the user, using the 4 way input device to select the portion of the track for user as the ringer. A window 61 is superimposed over the profile of the track that shows the portion of the track currently selected by the user. The user interface may also magnify the left edge of the track profile when the user adjust the starting point of the ringer as shown by the window 61. The user interface may also magnify the right edge of the track profile when the user adjust the length of the ringer as shown by the window 61 and then play a few seconds at the end of the ringer so that user can determine if the end is the appropriate location.

FIG. 4B shows a user interface 62 that allows the user to adjust certain other characteristics of the ringer such as a fade in or a fade out or various other characteristics of the ringer. FIG. 4C shows a user interface 64 that allows the user to preview the actual ringer on the mobile computing device before purchasing the ringer. In typical systems using WAP pages, it is not possible to permit a preview since the download from the WAP page would allow the user to preview and then keep the ringer without payment. In the ringer generator system, the ringer is streamed and is not permanently stored (downloaded into the memory and used by the JAVA code) so that it can be previewed without losing the ability to charge for the ringer. As shown in the series of user interfaces, the generator system permits the ringer generation and download to occur from a single series of user interfaces so that it is easier for the user to generate, preview and then download the ringer.

In an alternative embodiment, after viewing the representation of the fulltrack and selecting the start and end points of the track to be played when the phone rings as shown in FIG. 4A, the user can store the location of the start and end points for the ringer on the mobile computing device. Then, the mobile device can be modified to use the start and endpoints to playback only the portion of the fulltrack specified without the need to make another copy of the full track on the mobile computing device. In this alternative embodiment, if the user already owns the full track for the song being used to make the ringer and the full track is stored on the mobile computing device, the ringer generator does not need to make another copy of the full track of the song in order to playback the ringer. In this alternative embodiment, the ringer is played by playing the portion of the full track (identified by the stored start and end points of the ringer) whether the song uses DRM or not. Thus, the user does not need to pay for the mechanical and music rights to another copy of the full track in order to specify a new ringer.

FIG. 5 illustrates an example of a content system that may include the ringer generation system. As in the prior art, a user stores digital content (such as music, video, etc.) on computer 28. However, in this embodiment, the user downloads the digital data from computer 28 to mobile computing device 22 in a wireless fashion over a wireless communication path. Mobile computing device 22 may be a PDA, mobile phone, wireless email device (such as the Blackberry), or other handheld device that has wireless connectivity to be able to communicate with the computer 28 and download digital content from the computer 28. Computer 28 communicates with a device 24, such as a server computer, over network 29. Network 29 can be any type of network, such as the Internet, and can be hardwired, wireless, or some combination of the two. Computer 28 runs a software application that allows a user to catalog and organize the digital content of the user. The device 24 can be accessible over the Internet (such as through a URL address). The device 24 is shown in FIG. 5 as a single device. However, it is to be understood that the device 24 can instead comprise multiple devices, such as multiple servers.

Mobile computing device 22 connects to device 24 over a wireless network 26. Wireless network 26 can be a cellular telephone network, a WiFi network (such as an 802.11 network), a wireless data network (such as EV-DO or EDGE), or any other wireless network. It is to be understood that wireless network 26 need not connect directly to server device 24, but instead can connect through an indirect means such as by the Internet or through another network. The ringer generator system shown in FIG. 1 can be integrated with this content system.

Figure 6:
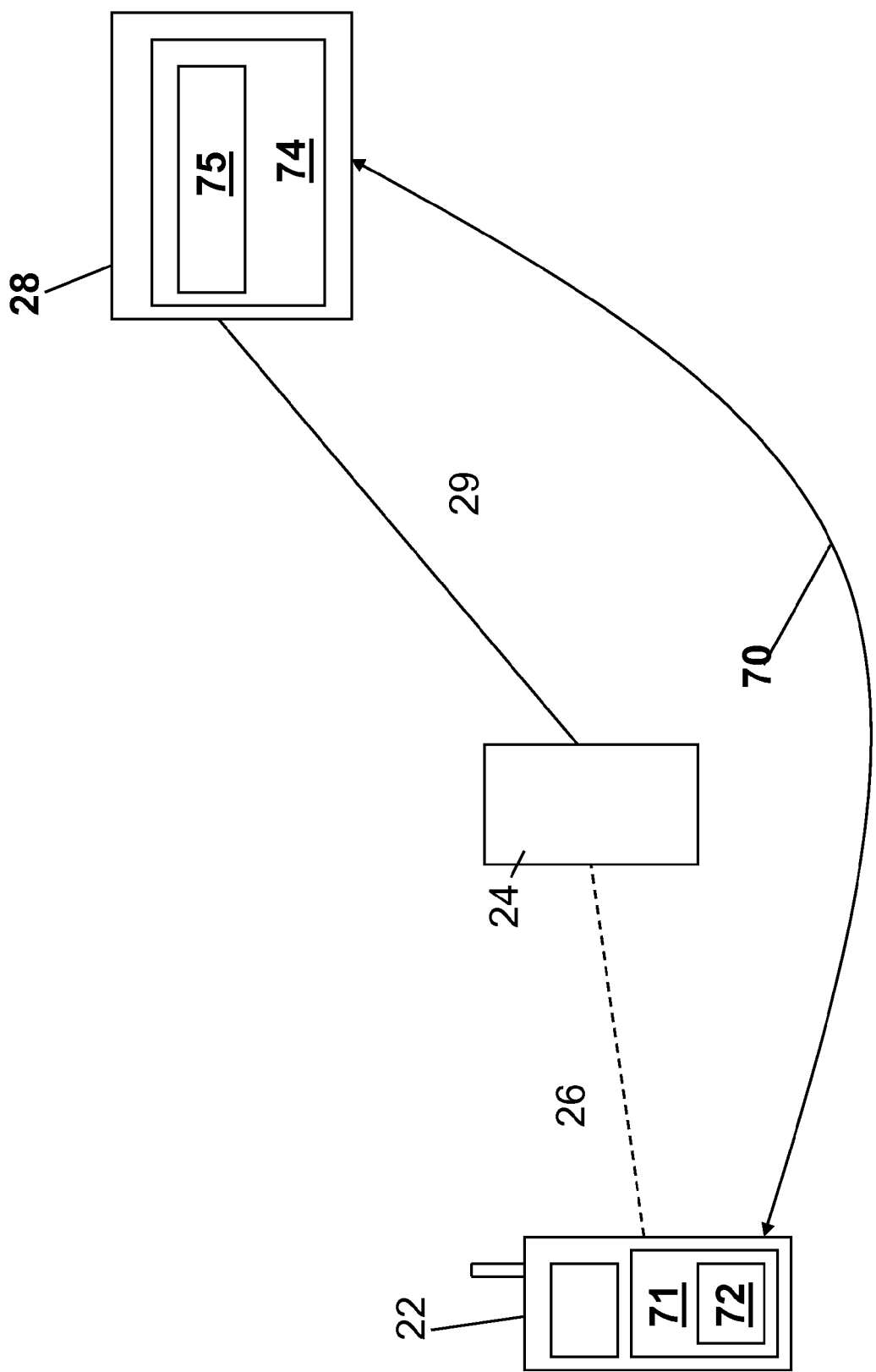
FIG. 6 illustrates an example of another content system that may include the ringer generation system.

FIG. 6 illustrates an example of another content system that may include the ringer generation system wherein the content system allows a mobile computing device 22 to share content among a plurality of computing devices wherein the mobile handset has the content store 71 and playlists 72. As shown, the system permits the mobile computing device 22 to synchronize its content with a plurality of computing devices $28_1$, $28_2$, ..., $28n$ and each computing device maintains a content store of the content on the mobile handset. For example, in a family in which the different family members each have their own computing device, the mobile handset of a particular family member can be synchronized to the multiple computing devices so that the content purchased by each member of the family can be shared. Similarly, the system permits multiple mobile handsets to synchronize their content with a single computing device (such as might be the case of a family) or multiple mobile handsets can synchronize their content with multiple computing devices. Thus, the system permits the computing devices to effectively share content between the computing devices.

Figure 7:
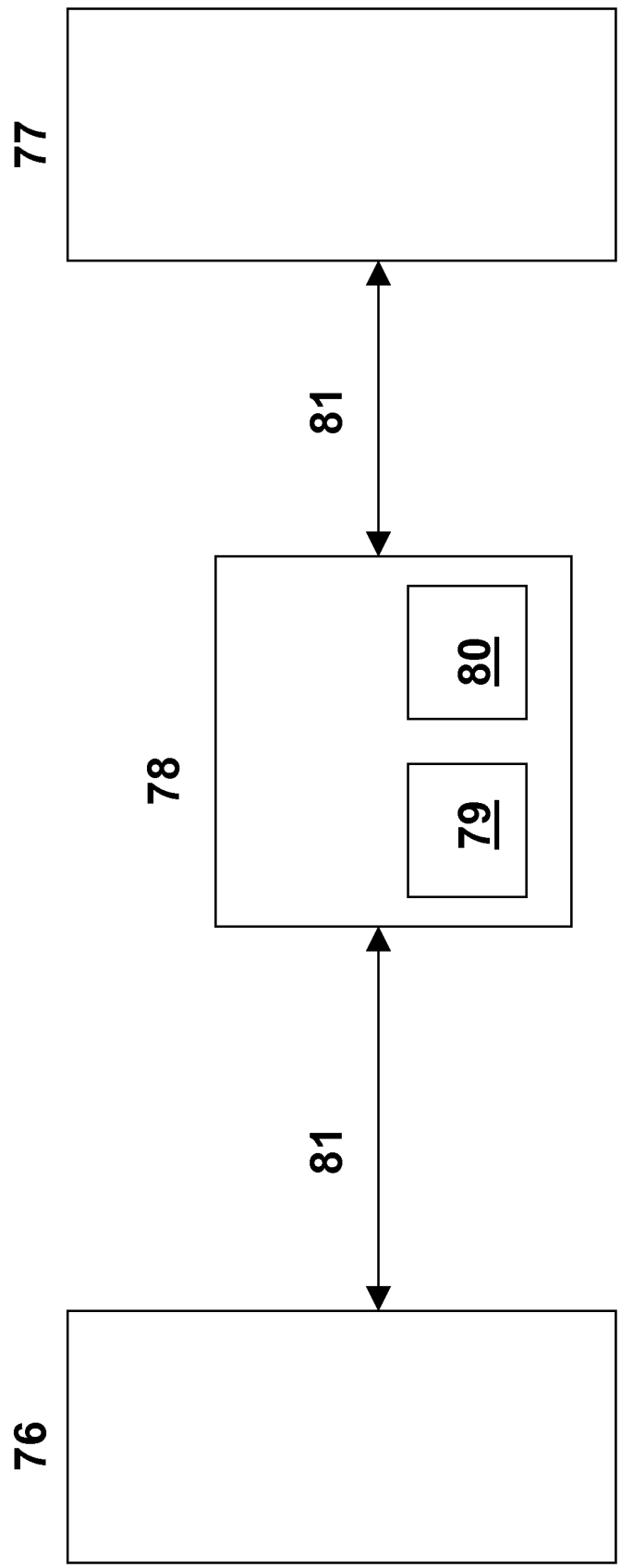
FIG. 7 illustrates an example of a prior art system for generating answer tones.

FIG. 7 illustrates the prior art system for generating an answer tone. Telephone 76 and telephone 77 can communicate over a network or link 81. Network or link 81 can consist of numerous sub-networks and links operated by different entities, such as two or more local telephone carriers or wireless carriers. Device 78 forms part of the connection between telephone 76 and telephone 77 when telephone 76 initiates a call from telephone 76 to telephone 77. Device 78 may include rules database 79 and content catalog 80 (or, in the alternative, database 79 and/or content catalog 80 can be operated on devices coupled to device 78). Rules database 79 is a database that instructs device 78 how to react in response to the initiation of a phone call by a specific telephone. For example, when User A uses telephone 76 to call telephone 77 (operated by User B), rules database 79 will be used to determine that the call is being initiated by telephone 76 (typically by recognizing the unique telephone number of telephone 76) and will cause device 78 to send an electrical signal representing an answer tone to telephone 76. Content catalog 80 contains the content that is used to create the answer tone. For example, content catalog 80 can contain the traditional "ring" sound that users are accustomed to hearing when they call someone, but it also sometimes includes other content offered by the operator of device 78, such as music clips. A user is able to configure his or her service by pre-selecting from content catalog 78 the answer tone he or she hears when initiating a telephone call. However, in the prior art system shown in FIG. 7, there is no mechanism by which a user can alter the content of content catalog 80 or use customized audio clips for the user's telephone calls. In other words, users are limited to answer tones that are placed in content catalog 80 by the operator of device 78.

Figure 8:
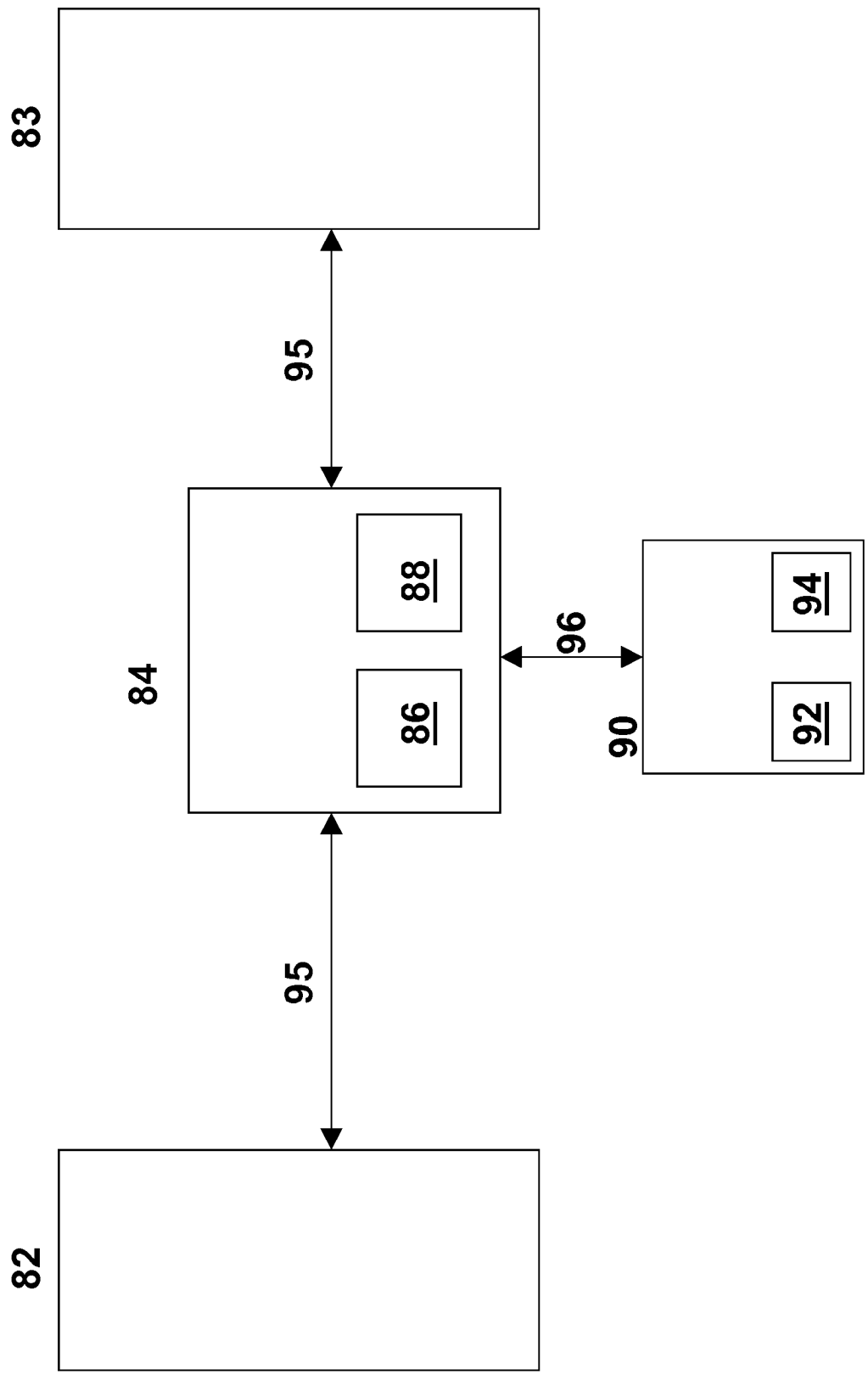
FIG. 8 illustrates an example of a system for creating an answer tone.

FIG. 8 shows an embodiment to permit users to customize answer tones. User A operates telephone 82. User B operates telephone 83. Telephones 82 and 83 can be traditional, land-line telephones, cordless telephones, mobile handsets that operate over a wireless network or link (such as a cellular network), other telephone devices, other devices with phone capabilities or other mobile computing devices with phone capabilities. Telephone 82 and telephone 83 can communicate over a network or link 95. Network or link 95 can consist of numerous sub-networks and links operated by different entities, such as two or more local telephone carriers or wireless carriers. User A initiates a telephone call using telephone 82 to telephone 83. Device 84 forms part of the connection between telephone 82 and telephone 83 during the initiation of the call and generates the answer tone that User A will audibly hear from the speaker of telephone 82 when telephone 83 is ringing. Device 84 typically is operated by the local telephone company (for land-line telephones) or a mobile carrier (for mobile devices). Device 84 may be a server computer with a plurality of lines of computer code that contains the ability to send electrical signals to telephone 82 that represent an answer tone. A clip generator 90, such as a server computer for example, operates a service (such as a website) that enables a user to create and/or select an audio clip that the user wishes to use as an answer tone. For example, the clip generator 90 might enable a user to create an audio clip using the same method and apparatus described above with reference to FIGS. 2-4 for creating ring tones. In our example, User A creates an audio clip 92 (such as a piece of music) that is stored in the clip generator 90. The clip generator 90 stores audio clip 92 in its memory or in another storage device such as a hard disk drive, optical drive, or other device. User A can create audio clip 92 using telephone 82 (for example, as discussed above with reference to FIGS. 2-4), or User A can create audio clip 92 using the prior art method of editing sound on a desktop or notebook computer. Audio clip 92 can be provided to the clip generator 90 over a connection from telephone 82 (such as via a wireless network), over the Internet, or over any other type of network.

The clip generator 90 then connects to device 84 over a network or link 96. Network or link 96 can be the same as network or link 95, or it can be different or partially the same. The connection can be made using a secure mechanism such as a VPN (virtual private network) connection. The clip generator 90 and device 84 communicate using APIs or other interfaces. The clip generator 90 informs device 84 that User A wishes to use audio clip 92 as his or her answer tone for telephone 82. Device 84 then modifies its rules database 86 to indicate that audio clip 92 should be used as the answer tone for telephone 82, and device 84 stores audio clip 92 (or a modified version thereof, such as a truncated or compressed version or a version of lower fidelity) in content catalog 88. Thereafter, when User A uses telephone 82 to call telephone 83, device 84 will send audio clip 92 (or a modified version thereof) to telephone 82, and telephone 82 will audibly play audio clip 92 (or a modified version thereof), so that User A hears audio clip 82 as the answer tone while he or she waits for User B to "pick up" telephone 83. Thus, rather than hearing a traditional ringing sound when User A places a phone call, User A instead will hear an audio clip (audio clip 92) that User A enjoys hearing, such as a portion of a favorite song.

Device 84 can be configured via the clip generator 90 to use audio clip 92 for all telephone calls placed by telephone 82 (to any telephone number), or it can be configured to use audio clip 92 only for telephone calls to a specific telephone such as telephone 83 and to use other audio clips for other specific telephone numbers. This enables User A optionally to select a different audio clip as an answer tone for each different telephone number that User A dials.

In another aspect of the system illustrated in FIG. 8, User B also can create an audio clip 94 and store in on the clip generator 90. The clip generator 90 can then configure device 84 to use audio clip 94 as an answer tone whenever a telephone calls telephone 83, or when a particular user calls telephone 83. For example, User B can designate audio clip 94 to be used as the answer tone specifically for telephone 82 whenever telephone 82 calls telephone 83, or User B can designate audio clip 94 to be used as the answer tone for all telephones or any subset of telephones. Thus, rather than hearing a traditional ringing sound when User A places a phone call, User A instead will hear an audio clip (audio clip 94) that User B enjoys, and that is a reflection of User B's personality and taste, such as a portion of a favorite song. This can be more interesting for User A to hear since it reflects User B's personality and taste and likely will be a different audio clip than is selected by other users.

FIG. 9 illustrates an example of rules database 86 and content catalog 88 in greater detail. A portion of rules database 86 is illustrated as exemplary table 97. The table contains the universe of possible caller telephone numbers and a code for each answer tone associated with each telephone number. As shown in the example of FIG. 9, the telephone number 555-666-0001 is associated with answer tone 1, the telephone number 555-666-0002 is associated with answer tone 47, etc. A portion of content catalog 88 is shown as exemplary table 98. Table 98 associates the code for each answer tone with the digital data that is used to create the actual answer tone (e.g., a digitized version of audio). As shown in the example of FIG. 9, answer tone 1 is associated with digital data that can be used to create an audible, traditional ring sound on a telephone. Answer tone 47 is associated with a portion of Beethoven's "Ode to Joy," etc.

In the example of FIG. 9, if the telephone number for telephone 82 is 555-666-0002, then when User A places a call on telephone 82 to telephone 83, User A will hear a portion of "Ode to Joy" as the answer tone.

FIG. 10 is identical to FIG. 9, except that answer tones are instead associated with the recipient's telephone number instead of the caller's telephone number. To that end, a portion of rules database 86 is illustrated as exemplary table 100, and a portion of content catalog 88 is illustrated as exemplary table 102. In this example, if the telephone number for telephone 83 is 555-666-0003, then when User A calls telephone 83, User A will hear a portion of "The Star Spangled Banner" as the answer tone.

The digital data stored in exemplary tables 98 and 102 can be placed there by the operator of device 84, or by a user via server 90 as discussed previously.

With reference to FIG. 11, another embodiment is shown. FIG. 11 is identical to FIG. 8, except device 84 has been replaced by device 104. Device 104 contains a rules database 106 and a content catalog 108. Device 104 can be a device that facilitates conference calls between a plurality of users, such as User A and User B. In the prior art, such a system typically provides "hold" music while the users wait for the "chairperson" of the call to start the call. The chairperson typically is the person who organized the conference call. The "hold" music is not customizable in the prior art. With reference to the embodiment shown in FIG. 11, however, the clip generator 90 can be used to configure device 104 to provide customized audio clips instead of the traditional "hold" music. For example, User A can store audio clip 92 on the clip generator 90 as discussed previously, and User B can store audio clip 94 on the clip generator 90 as discussed previously. The clip generator 90 then can interface with device 104 in the same manner discussed previously. In the system of FIG. 11, rules database 106 can be modified to indicate that when User A is the first person to join the conference call, then device 104 will cause audio clip 92 to be played as the "hold" music for all users until the chairperson joins the conference call. Similarly, if User B is the first person to join the conference call, then device 104 will cause audio clip 94 to be played as the "hold" music for all users until the chairperson joins the conference call. Playing customized audio clips instead of traditional "hold" music will be more interesting for the users, and provides an incentive to be the first person to join a conference call. It is to be understood that any number of other rules can be used to determine which audio clip is played. For example, device 104 instead can play the audio clip selected by the chairperson of the call, or it can cycle through the different customized clips selected by the various participants in the call.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method for generating an answer tone, comprising:
   selecting a track;
   determining if a user who selected the track owns full track rights for that track;
   generating a clip when the user has the full track rights;
   previewing said clip;
   purchasing said clip;
   associating said clip with a first computing device;
   storing said clip on a second computing device; and
   transmitting said clip from said second computing device to said first computing device as an answer tone when said first computing device initiates a phone call.

2. The method of claim 1, wherein the clip is an audio clip.

3. The method of claim 1, wherein the clip is an audio and video clip.

4. The method of claim 1, wherein said generating step is performed on said first computing device.

5. The method of claim 1, wherein said first computing device is a mobile computing device.

6. The method of claim 1, wherein said second computing device is a server.

7. The method of claim 5, wherein said second computing device is a server.

8. A system for generating an answer tone, comprising:
a first computing device configured to enable a user to select a track;
a second computing device coupled to said first computing device, said second
computing device configured to determining if said user owns full track rights for that track;
said first computing device further configured to generate a clip when the user has the
full track rights, to enable the user to preview said clip, and to enable the user to purchase said clip;
said second computing device further configured to associate said clip with a third computing device and to transmit said clip to said third computing device as an answer tone when said third computing device initiates a phone call.

9. The system of claim 8, wherein said clip is an audio clip.

10. The system of claim 8, wherein said clip is an audio and video clip.

11. The system of claim 8, wherein said first computing device and said third computing device are the same device.

12. The system of claim 8, wherein said second computing device is a server.

13. The system of claim 8, wherein said third computing device is a mobile computing device.

14. The system of claim 12, wherein said third computing device is a mobile computing device.

* * * * *